Oct. 21, 1958 A. FRANCK ET AL 2,857,100
ERROR DETECTION SYSTEM
Filed March 5, 1957
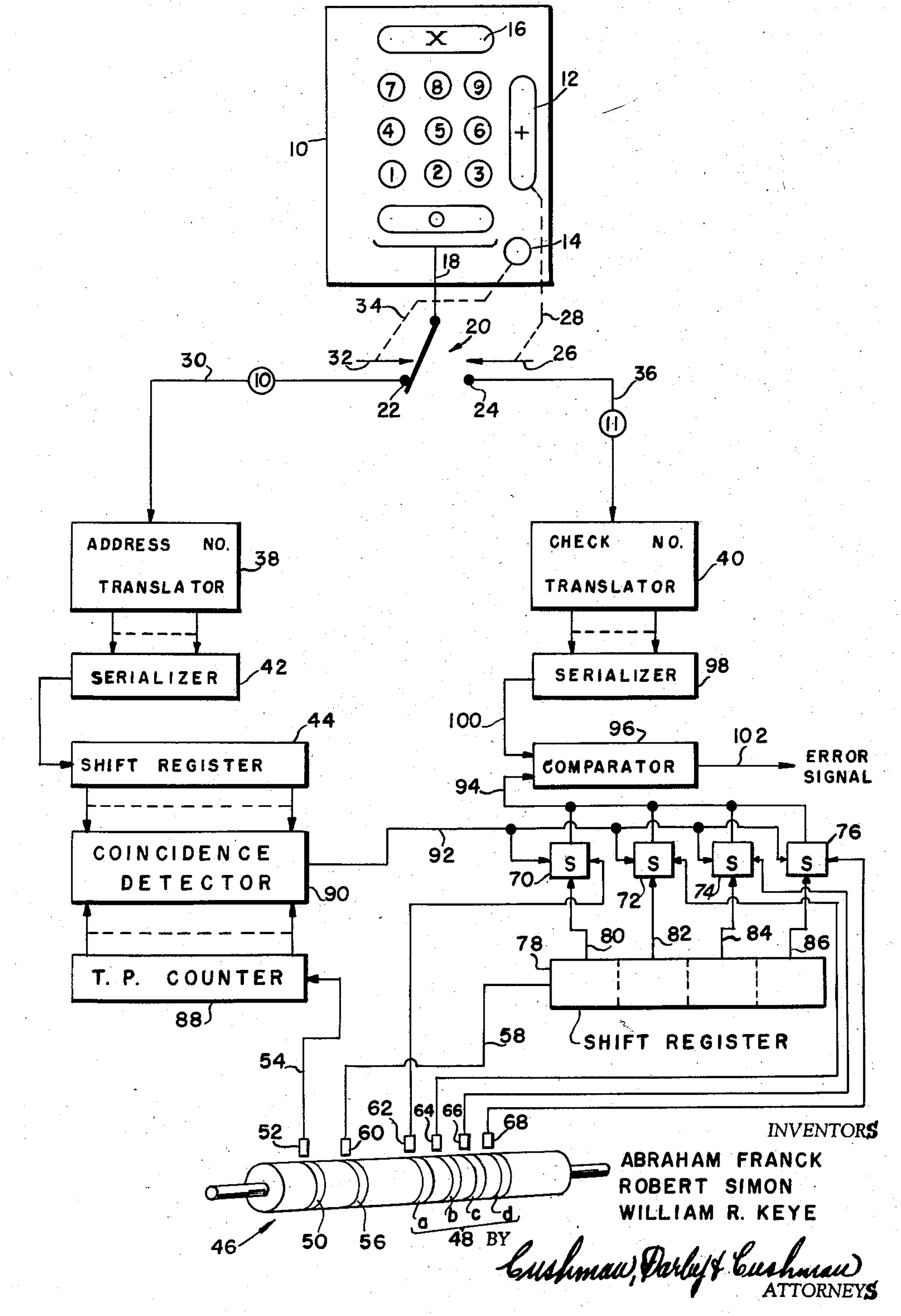
INVENTORS
ABRAHAM FRANCK
ROBERT SIMON
WILLIAM R. KEYE
BY Cushman, Darby & Cushman
ATTORNEYS United States Patent Office 2,857,100

Patented Oct. 21, 1958

2,857,100

ERROR DETECTION SYSTEM

Abraham Franck, Minneapolis, Minn., Robert Simon, Brooklyn, N. Y., and William R. Keye, St. Paul, Minn., assignors to Sperry Rand Corporation, New York, N. Y., a corporation of Delaware Application March 5, 1957, Serial No. 644,024

8 Claims. (Cl. 235—61)

This invention relates to an error detection system which gives an absolute check for the transposition of any two characters, not necessarily adjacent, in an N character message as well as a wrong character therein.

With the increased use of computers in business, human error tends to be reduced except at the point of input to the machine. But now the computer itself with its thousands of electronic components is subject to error, and must utilize some of its circuits to check up on its own operations. In some machines, this checking feature is most rudimentary; in others; such as in some machines of the UNIVAC series of computers, the operation of the machine is checked continuously, or in a more complicated fashion such as in parallel or repetitively. Curiously enough, even though the calculations involved in the solution of business problems are usually simple enough to be understood and carried out by a high school student, elaborate error-checking at every stage of a calculation is usually a more critical requirement for business problems than for the complex and lengthy computations of science and engineering. The reason for this paradox is contained in the nature of the problems themselves. The data which furnishes the input to a scientific computation is usually itself only approximate, and very small errors lose significance. Then too, the successive sets of data which enter the computation are often closely related to one another, and comparison among the different sets is possible at both input and output. Finally, the very complexity of the calculations tends to guard against undetected errors. A small error propagated through a long calculation quite often builds up until the final answer is obviously ridiculous.

The situation is very much different for business problems. Here each calculation is essentially independent of the rest. The result of updating one inventory item, for example, bears no relation as a rule to the result obtained by updating a second item. An error in the first can hardly be detected by examining the second. Also small errors have an importance which is, for the most part, independent of their size. An error in a bank statement is serious even if it amounts to only a few pennies as is an error of only a few pounds in an inventory balance sheet. Even the simplicity of the arithmetic involved works against the easy detection of errors. The steps are few, and since there is little opportunity for a small error to grow into a large one in the computation process, the final answer may not appear incorrect at all.

Even the best computer, however, cannot guard unaided against the errors made by the human operator in preparing the input data and translating it into machine language. Because of the extremely high volume of input data which is characteristic of business problems, these human errors at the input station are quite common. For example, a keypunch operator can mispunch the stock identifier code for an inventory record, substituting one or more characters, or transposing two or more pairs of characters. If it should occur that the mispunched identifier was itself a valid identifier for another stock item, the computer would, of course, be unaware an error had occurred, and would proceed to update this inventory item with the information belonging to the other. If, on the other hand, the incorrect identifier would fit no item in stock, the computer might search vainly through the entire inventory for this item. However, no harm is done to the recorded data and careful programming might even catch this type of error, provided that the operation of seaching through the entire stored inventory were to be designated in advance as an error in itself, and thus it would be recognized.

The account number of a depositor in a savings bank is another item or category which is identified by a unique code number. It is obvious that recording a transaction in the wrong account is not acceptable. No completely satisfactory system has been devised for catching all the errors which an operator may make in punching the identifying code number on a keyboard.

The prior art has only guaranteed the absolute checking of the change of adjacent characters in an N character message. The present invention guarantees absolutely the detection of all transpositions of any two characters whether adjacent or non-adjacent.

One object of this invention is to enlarge the class of transposition errors as applied to character messages which can be detected. The implementation of this error detection system, as can be used for example in a computer system, will check absolutely the following:

(*a*) Transposition of any two characters, not necessarily adjacent, in an N character message.

(*b*) The random change of a single character in an N character message.

Another object of this invention is to provide for a particular keyboard system or for the internal mechanism in an electronic computer, apparatus for using a number as a storage (for example, magnetic drum) address locator code to compare a recorded check number with the check number which an operator sets on a keyboard register or which is generated in an electronic computer.

With the foregoing and other objects in view, as will become apparent to those of ordinary skill in the art, the present invention comprises an electronic system designed to provide an automatic means of checking a character entry, an exemplary embodiment of which system is more fully described in the following description, in conjunction with the accompanying drawing.

Any group of N information characters in the form of a message M may be defined as $$M=C_1C_2C_3\ .\ .\ .\ ,C_N$$

considering any one of the characters $C_i$, where the subscript $i$ refers to the $i$th character, it will be appreciated that numeric or specific character symbols such as /, $, A, B, 8, 10, etc., may be used therefor. Any such symbols may be termed alpha-numeric characters. Alternatively, although not normally done, values can be assigned to characters consisting of more than one digit (such as pairs, or triplets, etc.) provided due allowance is made for an appropriate modulus, in a manner similar to that explained below.

In order to determine a true check symbol for any message or particular group of characters, a unique numeric value, for example, A=10, C=12, . . . Z=35, $=36, etc., may be assigned to each different character $C_i$ in the message. In addition, each order or position of the character $C_i$ may be assigned a "weight" $w_i$. The weights so assigned must satisfy the criteria mentioned below. With each group of characters or message M there is associated a check character or symbol whose numeric value is dependent on the values of $C_i$ and $w_i$ assigned to the characters in the group as well as a number which may be termed the "modulus." After the unique numeric values $C_i$ have been assigned to the characters in the message, the different weights $w_i$ and modulus may be determined in accordance with the following criteria:

The criteria on the modulus are the following:

(*A*) The modulus must be a prime number, and (*B*) The modulus must be greater in absolute value than the largest unique numeric value assigned to any character $C_i$ in the system.

The criteria on the weights are the following:

(*A*) The difference between any two weights must not be equal to 0, and (*B*) The modulus and the difference between any two weights must be relatively prime, i. e., they must have no common factors except unity.

The procedure for determining the check symbol after assignment of unique numeric values for each character and selection of weights and a modulus, may proceed in the following steps:

(*A*) For each character $C_i$, form the product $w_iC_i$ (*B*) Sum all the products $w_iC_i$ (*C*) Divide the resultant sum by the selected modulus and determine the remainder.

The remainder resulting from the preceding procedure is defined as the true check character or symbol for the particular group of characters in the message M. From the above it will be apparent that any given set of weights that satisfy the criteria therefor would perform their necessary function in determining a true check symbol; as an example, the simplest sets of weights are the integers 1, 2, 3, 4 . . . N, which may be assigned to the group of characters in order from left to right or from right to left. However, such weights may be permutted in any desired manner. For example, if N=9, $C_1$ through $C_9$ may respectively be assigned the weights 1, 3, 5, 7, 9, 2, 4, 6, 8 since the above criteria for the weights is satisfied by such an assignment of weights. Therefore, the choice of weights is independent of the position or order of the character in the message insofar as the error detection system is concerned. If it were desired to derive the check characters as one goes along, instead of pre-calculating them and pre-recording them in the manner hereinafter described, one could form the product $w_iC_i$, adding the individual term $C_i$ for $w_i$ times, in accumulator whose maximum is one less than the modulus. This process should be summed for all possible *i*.

As an illustration of the above, assume a message M consisting of the following group of characters:

AC34069TZ

Further, assume that the individual numbers 0 through 9 in the message example have their original numeric values assigned to them, while the letters A through Z have ascribed to them the numeric values 10 through 35 respectively so that A=10, C=12, T=29 and Z=35. Assigning to each character in the message example from left to right the weights 1, 2, 3, 4, . . . 9, respectively, the weighted sum of the message will be 375 in accordance with the following table:

TABLE

| M | $C_i \times w_i$ | $C_iw_i$ |
|---|---|---|
| Z | 35×1 | 35 |
| T | 29×2 | 58 |
| 9 | 9×3 | 27 |
| 6 | 6×4 | 24 |
| 0 | 0×5 | 0 |
| 4 | 4×6 | 24 |
| 3 | 3×7 | 21 |
| C | 12×8 | 96 |
| A | 10×9 | 90 |
| Weighted Sum | | 375 |

Choosing as a modulus the numeric value 37, which satisfies the criteria above mentioned, the remainder 5 becomes the true check symbol for the example message.

If in the above example the letter C is interchanged with the letter T, the weighted sum would then be 477 with a check symbol corresponding to the remainder 33. Therefore, upon comparing the latter check symbol with the true check symbol 5, a lack of correspondence will be noted and an error detected.

Applying the above to a specific embodiment utilizing a computer such as an adding machine employing the decimal system, it will be apparent that the modulus may be chosen as the number 11 in accordance with the criteria therefor stated above.

Any type of registering device such as a computer may be utilized with this invention, and in the drawing a 10-key adding machine designated by reference character 10 is provided to illustrate the invention. The 10-key machine may be of the conventional type having keys for the numbers 0 through 9 and an entry key 12. In addition, the machine has a key 14 which functions to separate the group of characters such as an address number or number to be operated upon by the machine from its check symbol, which symbol in this example may be a number ranging from 0 through 9 plug "X", X being the eleventh check symbol possibility and corresponding to the number 10. Bar 16 provides the X in this example. Assuming a list of information or address numbers and their respective check symbols are to be entered into the machine, the list might appear with each address number being followed by a space or dash mark and a check number thereafter. Therefore, the key 14 may be utilized to cause printing of a dash mark between the address number and the check number, or alternatively, it may merely space the two numbers. Each of the numerical keys 0 through X is connected via a switch (not shown) or like means to an individual line in the cable 18, whereby depression of any one of the numerical keys provides a signal over its respective line in the cable 18. Each of the lines in cable 18 connects to a different switch represented as a group by switch 20 which connects ten of the individual lines in cable 18 to ten lines respectively through terminal 22, and to eleven lines respectively through terminal 24.

Upon entering any address number and its check number into the machine by depression of the entry key bar 12, switch 20 is moved to contact terminal 22 in any convenient manner such as by arm 26 operatively connected to entry key 12 as indicated by dash line 28. Then during a following depression of numerical keys 0 through 9 for insertion of an address number, an electrical signal passes from the respective keys to the respective lines in cable 30 via terminal 22. When the keys for the address number have been depressed and it is desired to insert the check number, key 14 is depressed so as to cause switch 20 to move to the right to contact terminal 24. This movement may be accomplished in any desirable manner and as diagrammatically illustrated, the switch arm is pushed by an arm 32 operatively connected to key 14 as indicated by dash line 34. A following depression of one of the numerical keys 0 through X will then provide a signal on one of the eleven lines in cable 36 connected to terminal 24.

Cables 30 and 36 are each connected to a translator 38 and 40, respectively. The address number translator 38 operates to translate the decimal number serially received by it into a coded binary number. Any type of binary coding such as pure binary, pure binary-coded decimal, binary-coded decimal in excess-3 mode, etc., may be accomplished by the translator 38. As an example of a translator which uses the excess-3 coding system, reference is made to the diode translator matrix illustrated in Figure 15-5 on page 413 of the book, "High Speed Computing Devices" written by the staff of Engineering Research Associates, Inc., McGraw-Hill Book Company, New York, 1950. Using such a translator, each decimal number input will provide a four-binary-digit parallel output. The output is then changed to serial form by serializer 42, which may take any of the well known forms and may be, for example, a tapped delay line or a series of flip-flops connected as a shift register or any parallel to serial converter, an example of which is illustrated in the above mentioned book at page 268 in Figure 13–2*b*. The serialized output is delivered to a shift register 44 which at the time key 14 is depressed contains the complete address number with each of the binary digits representing it being respectively in a different stage within the shift register. Assuming the translator provides a four-digit binary output for each decimal input, and further assuming that the adding machine has only three places or orders for the address number so that each address number will consist of at most three decimal digits, the shift register would have 12 stages. The shift register may be of any desirable type and as an example thereof, reference is made to page 299, Figure 13–25 of the above mentioned book.

In keeping with the assumptions above made that the computer 10 is capable of utilizing any address number from 000 through 999 so that 1000 different addresses may be obtained, and that each address number has a check symbol which is represented by a decimal number (to the base 11), it will be apparent from the foregoing that the check number entered into the machine must be compared so that a detection of any error therein may be accomplished. A storage means such as magnetic drum 46 is utilized to pre-store the true check numbers for each one of the possible numbers which may be utilized as an address number in the machine 10. In the example chosen to illustrate the invention, the magnetic drum 46 has recorded thereon in tracks 48 the check numbers corresponding to the different possible addresses. Track 50 contains a series of indicia which produces through transducer 52 a series of timing pulses TP on line 54, while track 56 has a single indicia thereon which provides an initiate or starting pulse on line 58 of the transducer 60.

With 1000 possible number combinations for machine 10, there are 1000 check numbers each of which when using the excess-3-coding system has four binary digits. Therefore, 4000 cells on the magnetic drum are necessary to record the 4000 binary digits of the check numbers. Assuming a diameter of the drum 46, which at approximately 80 cells per inch, would provide 1000 cells per track circumference, there would be four tracks necessary in the group of tracks 48 to store all the check numbers. The check numbers are stored in serial form not only as to the binary digits of any single check number, but also as to the check numbers as a whole from the standpoint of their representing the possible 1000 combinations starting from 000 to 999. That is, each of the four tracks, *a*, *b*, *c*, and *d* store 250 check numbers with track *a* storing the first 250 seriatim, track *b* storing the next 250 seriatim, etc. Therefore, the angular location of any check number on the different tracks relates to a particular address number.

Through the transducers 62, 64, 66 and 68, the contents of tracks *a*, *b*, *c* and *d* are read and presented respectively to And circuits 70, 72, 74 and 76. With each revolution of drum 46, a pulse on line 58 is produced and shift register 78 causes an output on a different one of its output lines 80, 82, 84 and 86. Therefore, the outputs from transducer 62, 64, 66 and 68 are in effect sequentially shifted respectively from And circuit 70, to And circuit 72, to And circuit 74, then to And circuit 76 in response to the respective outputs from shift register 78. At the same time, counter 88 is counting the timing indicia on track 50. Whenever the count of the indicia in binary form matches the binary address number in shift register 44, coincidence is detected in coincidence detector 90 which provides an output at that time on line 92. Line 92 delivers the coincidence output in parallel to And circuit 70, 72, 74 and 76. Therefore, the particular And circuit which has all three of its inputs enabled at that time, provides an output on line 94 to comparator circuit 96.

While all the foregoing has transpired, the check number entered into the machine 10 has been delivered over one of the eleven lines in cable 36 to the check number translator 40. This translator changes the decimal number input to a binary number of the same form as that received by serializer 42 and may be the same as translator 40 with the addition of one row of diodes to the matrix to provide for the elevent input. The translator output is provided to a serializer 98 which may be of the same type as serializer 42, so that the comparator 96 receives the translated check number in serial form. The comparator then compares the translated check number with the true check number from drum 46 bit by bit and produces a signal on output line 102 when any of the compared bits are unalike. That is, a signal on line 102 indicates anti-coincidence of the translated check number and the stored check number, such anti-coincidence signal being indicative of error in the number inserted into the computer 10, and as noted above such error may be produced by insertion of one or more wrong numbers in the address number or the transposition of any two or more adjacent or nonadjacent numbers in the address as well as the insertion of a wrong check number for a bit address number. The error signal on line 102 can be used, therefore, to produce an alarm so as to notify the operator of the error in the machine.

As an example of the type counter that the timing pulse counter 88 may be, reference is made to chapter 3 of the above mentioned book. Any of the counters therein may be utilized and in particular the counter of Figure 3–4 on page 18 when expanded to the proper number of stages is qutie suitable. The shift register 78 may be similar to shift register 44 with a different number of stages, register 78 having one stage for each of the tracks in the group of tracks 48.

Coincidence detector 90 as above explained operates to compare the binary digits in the shift register 44 and the counter 88 in parallel. A detector of this sort may take any of the number of known forms and may, for example, have in each stage thereof an Exclusive-Or circuit, the outputs of which are connected to an And circuit for disabling a gate from passing timing pulses except when each Exclusive-Or circuit provides an output. The gated timing pulse upon coincidence may be stretched, if necessary, in any desirable manner or may operate a monostable multivibrator to provide an enabling signal to And circuits 70, 72, 74 and 76 for a necessary length of time to pass the serial binary check number from one of the tracks in group 48. Exclusive-Or circuits are well known in the art any any type may be utilized herein, an example of which is illustrated and described in Figure 5, circuit 105 in the commonly owned application of Moe et al., Serial No. 585,312, filed May 16, 1956. Instead of using the timing pulse counter 88 and coincidence detector 90, the system illustrated in Figure 4 of the patent to Cohen et al., No. 2,540,654, may be employed with the preset-N-stage binary counter 71 therein operating similarly to produce an output to gate the binary check number from the storage medium.

Comparator 96, as illustrated, functions to compare the stored check number and the translated check number digit by digit. Apparatus that will accomplish such a function is well known in the art and an example thereof is a subtractor circuit. A suitable subtractor is illustrated in the above mentioned book at page 282 in Figure 13–14. However, such a subtractor need not be fully utilized since the "carry" portion thereof is not essential. An alternative to such a subtracting circuit is any suitable anti-coincidence circuit, one form of which may be noted in Figure 4 of the commonly owned application of John L. Hill, Serial No. 431,108, filed May 20, 1954. Anti-coincidence of the two inputs in said Figure 4 is present on line 222 thereof so that the circuitry following this line need not be employed. Another possibility for comparing the inputs to comparator 96 in the instant application is the use of an Exclusive-Or circuit of the type above mentioned.

In the above embodiment, it was assumed that drum 46 would store 1000 binary digits per track in group 48. It is, of course, apparent that a drum may be made of such diameter, for example, approximately 16 inches in diameter, so that the number of available storage cells per circumferential track is equal to 4000. In this event, the check numbers may be stored therein in binary form serially so that shift register 78 and the three excess tracks, e. g., tracks *b*, *c*, and *d*, as well as the corresponding And circuits need not be utilized.

As another alternative, the check numbers may be stored in the drum in parallel fashion. That is, assuming each check number to consist of four binary digits, the digits of any one check number may be stored in four tracks respectively in electrical alignment so that the transducers associated with the respective four tracks read the total binary check number at the same instant of time. With a system of this sort, the storage capacity of a given diameter drum is increased and if desired, a shifting system whereby the output from the drum is transferred to another set of four tracks in a manner similar to that illustrated for a single track, may be employed so as to increase the storage capacity to any number of check numbers desired. For parallel storage of check numbers all on a single set of tracks, the shift register 78 need not be employed, but transducers 60, 62, 64 and 66 would be connected directly to the And circuits 70, 72, 74 and 76 so as to provide parallel outputs which would not be connected in series to the comparator, but would be connected in parallel thereto. The serializer 98 would also be removed so that the parallel output from translator 40 would be presented to the comparator 96 at the same time as the output from the And circuits. Parallel comparison then would take place and the comparator could be similar to that described for coincidence detector 90. For parallel storage of binary digits, the system described and claimed in the commonly owned application of Hendrickson et al., Serial No. 203,612, filed December 30, 1950, now Patent No. 2,771,595, may be utilized. Of course, it is possible to associate other intelligence data with the recorded check number for whatever purposes desired. In this connection, the apparatus in the above referred to commonly owned application of Hill, Serial No. 431,108 may be used.

As mentioned above, the invention is applicable not only to adding machines of the 10-key variety, but to multiple column adding machines, comptometers and the like. The invention is also applicable to electronic computers for checking the accuracy of computations made at any stage within the computer.

The invention may also be utilized to check the accuracy of any computation in any type of computer. This is true since any arithmetic operation (i. e., addition, subtraction, multiplication and division) on a group of characters such as an address number will provide an answer such as a list of several address numbers, which will have a check number corresponding to the same operation on the individual check numbers for their corresponding group of characters when moduli such as 13, 17 and 19 are used. For example, to accomplish such results in the decimal system (but keeping in mind that systems other than decimal are encompassed by this invention), these moduli are associated with appropriate weights in accordance with Tables 1, 2 and 3, to wit:

*Table 1.—Modulus 13*

1, 10, 9, 12, 3, 4

*Table 2.—Modulus 17*

1, 10, 15, 14, 4, 6, 9, 5, 16, 7, 2, 3, 13, 11, 8, 12

*Table 3.—Modulus 19*

1, 10, 5, 12, 6, 3, 11, 15, 17, 18, 9, 14, 7, 13, 16, 8, 4, 2

The weights listed in each of these tables from left to right may be associated respectively with an address number from right to left. By associating the appropriate weights in accordance with the above tables, both the individual entries and resulting mathematical operations may be checked. A comparison of the check numbers would preferably be made not only for the resulting answer, but for each of the individual entries. However, such a procedure is not essential. To illustrate, consider the addition of 4356 and 3216 when using modulus 13 and the weights assigned in Table 1 for the respective digit positions. For 4356 the check number is 1 and for 3216 the check number is 5. Then upon adding the numbers and their check numbers the result is as follows:

4356—1
3216—5
(Sum) 7572—6

It will be noted that the sum of the check numbers, 6, is the check number for the correct sum so that agreement between the summation of the check numbers and the check numbers for the sum verifies correct addition. Had number 4356 been entered as 4536, the sum would have been 7752 which itself has a check number of 4 so that lack of agreement between the added check numbers and the check number of the sum shows the error. To check both the aforementioned transposition errors, as well as errors in arithmetic combinations, the number 13 is the least modulus which can be used for numbers of no more than 6 decimal digits. Moduli 17 and 19 allow larger numbers up to 16 decimal digits and 18 decimal digits, respectively, to be checked sequentially in the above manner. In addition, higher numbers can be used as moduli as can the products of prime numbers above 11. The residue class for use with the arithmetic checks can be obtained by dividing the entry number by the modulus with the reminder being the check number (or residue class) as above explained. This equivalent to defining the weights for the different digit positions as the residue class of the corresponding powers of the base.

Thus it is apparent that there is provided by this invention systems in which the various phases, objects and advantages herein set forth are successfully achieved.

Modifications of this invention not described herein will become apparent to those of ordinary skill in the art. Therefore, it is intended that the matter contained in the foregoing description and the accompanying drawings be interpreted as illustrative and not limitative, the scope of the invention being defined in the appended claims.

What is claimed is:

1. A system for detecting errors involved in the use of computing apparatus or the like comprising means for registering a group of information characters, means for registering at least one check character, storage means coupled with the information character registering means for containing given check characters for each possible group of information characters, and comparison means responsive to said storage means and to check character registering means for providing an indicative signal when a check character delivered from said storage means does not agree with the registered check character.

2. A system for detecting errors involving the use of computing apparatus or the like comprising means for registering a group of information characters, means for registering at least one check character, storage means for containing given check characters for each possible group of information characters, means intercoupling said storage means and the information character registering means for locating and delivering the check character in the storage means corresponding to a group of registered information characters, means for delivering a registered check character, and comparison means responsive to the delivered registered check character and to the delivered stored check character for providing an indicative signal when said delivered check characters do not agree.

3. A system as in claim 2 wherein the storage means is a magnetic record having a plurality of timing indicia thereon, and wherein the intercoupling means includes means for counting said indicia and means including coincidence detection means for comparing a count thereof with the registered group of information characters and for producing a signal upon coincidence thereof, the coincidence signal being operative to cause deliverance of said corresponding check character and storage means, said information characters being represented in a form similar to the counted indicia.

4. A system as in claim 3 wherein the registered information and check character are each a decimal number and wherein the intercoupling means includes means for translating the information decimal number to binary form for presentation thereof to the coincidence detection means and wherein the registered check character delivering means includes means for translating the decimal check number into said binary form for delivery thereof to said comparison means, said storage means having the check characters therein stored in said binary form.

5. A system for detecting errors of the type including one or more wrong characters and transposition of any two or more adjacent or non-adjacent characters in a group of characters in a computer, said group having a true check symbol which is the remainder resulting upon dividing the sum of the products of a different numeric value for each different character and a different numeric weight for each character by a modulus, said modulus being a prime number and having an absolute value greater than the numeric value for any character in the group, the different weights being of such numeric value that the difference between any two is not equal to zero but is relatively prime with said modulus, comprising a computer having means representing said group of characters and a check symbol, means for pre-storing the true check symbol for said group of characters in predetermined form, means coupled to said computer for supplying therefrom said group of characters in said predetermined form to the pre-storing means to cause readout from the pre-storing means of said true check symbol, means coupled to the computer for supplying therefrom the check symbol therein in said predetermined form, and comparison means for receiving the so supplied computer check symbol and said true check symbol and providing a signal when said symbols do not correspond, the lack of correspondence thereof being indicative of at least one type of said errors in the group of characters in the computer.

6. A system for detecting errors of the type including one or more wrong characters and transposition of any two or more adjacent or non-adjacent characters in a group of characters in a computer, said group having a true check symbol which is the remainder resulting upon dividing the sum of the products of a different numeric value for each different character and a different numeric weight for each character by a modulus, said modulus being a prime number and having an aboslute value greater than the numeric value for any character in the group, the different weights being of such numeric value that the difference between any two is not equal to zero but is relatively prime with said modulus, comprising a computer having means for issuing signals representing said group of characters and a check symbol, said characters and check symbol being in decimal form, means for pre-storing the true check symbol for said group of characters in binary form, means for translating the issued signals for said group of characters into said binary form, means for translating the issued signals for said check symbol into said binary form, means utilizing the translated group character signals for locating the true check symbol thereof in the storage means, means for reading the true check symbol from the storage means when located therein, and means for comparing the translated check symbol with the true check symbol from said storage means including means for providing a signal when said symbols do not correspond, the lack of correspondence thereof being indicative of at least one type of said errors in the group of characters in the computer.

7. A system for detecting errors of the type including one or more wrong characters and transposition of any two or more adjacent or non-adjacent characters in a group of characters in a computer, said group having a true check symbol which is the remainder resulting upon dividing the sum of the products of a different numeric value for each different character and a different numeric weight for each character by a modulus, said modulus being a prime number and having an absolute value greater than the numeric value for any character in the group, the different weights being of such numeric value that the difference between any two is not equal to zero but is relatively prime with said modulus, comprising a combuter having means for representing a plurality of groups of characters and a predetermined number of check symbols, means for pre-storing the true check symbol for each of said plurality of groups of characters in predetermined form, means operatively connected to said computer for supplying therefrom one of said group of characters in said predetermined form to cause readout from the pre-storing means of the true check symbol associated with said one group of characters, means operatively connected to the computer for supplying therefrom in said predetermined form the check symbol therein associated with said one group of characters, and comparison means for receiving the so supplied true check symbol for said one group of characters and for providing a signal when said symbols do not correspond, the lack of correspondence thereof being indicative of at least one type of said errors in the group of characters in the computer.

8. A system for detecting errors of the type including one or more wrong characters and transposition of any two or more adjacent or non-adjacent characters in a group of characters in a computer, said group having a true check symbol which is the remainder resulting upon dividing the sum of the products of a different numeric value for each different character and a different numeric weight for each character by a modulus, said modulus being a prime number and having an absolute value greater than the numeric value for any character in the group, the different weights being of such numeric value that the difference between any two is not equal to zero but is relatively prime with said modulus, comprising a computer having means for representing a plurality of groups of characters and a predetermined number of check symbols, means for pre-storing in binary form a true check symbol for each of said groups of characters, means for entering one of said plurality of characters and a check symbol in said computer for causing signals representative thereof, means for translating the signals representing the entered group of characters into said binary form, means responsive to the binary translated group of characters for locating in said storage means the true check symbol for said one group of characters, means for reading the so located true check symbol, means for translating the signals representing the check symbol in said computer into said binary form, and means for comparing the translated check symbol and the stored true check symbol for providing a signal when said symbols do not correspond, the lack of correspondence thereof being indicative of at least one type of said errors in the group of characters in the computer.

No references cited.